US011153511B2

(12) United States Patent
Tezuka et al.

(10) Patent No.: US 11,153,511 B2
(45) Date of Patent: Oct. 19, 2021

(54) CONTROL APPARATUS OF RADIATION IMAGING APPARATUS, CONTROL METHOD OF THE SAME, AND RADIATION IMAGING SYSTEM

(71) Applicant: CANON KABUSHIKI KAISHA, Tokyo (JP)

(72) Inventors: Shimpei Tezuka, Oyama (JP); Akiya Nakayama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/987,543

(22) Filed: Aug. 7, 2020

(65) Prior Publication Data

US 2021/0067711 A1    Mar. 4, 2021

(30) Foreign Application Priority Data

Aug. 27, 2019 (JP) .............................. JP2019-154971

(51) Int. Cl.
*H04N 5/32* (2006.01)
*G01T 1/20* (2006.01)
*G01T 1/17* (2006.01)

(52) U.S. Cl.
CPC ................. *H04N 5/32* (2013.01); *G01T 1/17* (2013.01); *G01T 1/2014* (2013.01)

(58) Field of Classification Search
None
See application file for complete search history.

(56) References Cited

U.S. PATENT DOCUMENTS

| 9,052,400 | B2 | 6/2015 | Saruta et al. | |
| 9,395,450 | B2 | 7/2016 | Tezuka et al. | |
| 10,498,975 | B2 | 12/2019 | Tezuka et al. | |
| 10,741,296 | B2 | 8/2020 | Sasaki et al. | |
| 2011/0218432 | A1* | 9/2011 | Tumer | A61B 6/508 600/431 |
| 2013/0153775 | A1 | 6/2013 | Nomura et al. | |
| 2014/0091225 | A1 | 4/2014 | Sasaki et al. | |
| 2014/0151769 | A1 | 6/2014 | Wayama et al. | |
| 2015/0189194 | A1* | 7/2015 | Tajima | A61B 6/488 378/62 |
| 2020/0018710 | A1 | 1/2020 | Tezuka et al. | |
| 2020/0155108 | A1 | 5/2020 | Saigusa et al. | |
| 2020/0213504 | A1 | 7/2020 | Saigusa et al. | |

FOREIGN PATENT DOCUMENTS

| JP | 2006-087566 | 4/2006 |
| JP | 2006-247102 | 9/2006 |

* cited by examiner

*Primary Examiner* — Edwin C Gunberg
(74) *Attorney, Agent, or Firm* — Venable LLP

(57) ABSTRACT

A control apparatus of a radiation imaging apparatus configured to generate a plurality of radiation images to transmit to an external apparatus is provided. The control apparatus includes an acquisition unit configured to acquire a generation cycle of the plurality of radiation images, a partial readout time required for the radiation imaging apparatus to read out a region of interest in one radiation image of the plurality of radiation images, and a transmission time estimated to be required to transmit the one radiation image. The control apparatus also includes a determination unit configured to determine, based on the generation cycle, the partial readout time, and the transmission time, a time at which the radiation imaging apparatus starts transmission of the plurality of radiation images.

12 Claims, 13 Drawing Sheets

CONTROL APPARATUS OF RADIATION IMAGING APPARATUS, CONTROL METHOD OF THE SAME, AND RADIATION IMAGING SYSTEM

BACKGROUND OF THE INVENTION

Field of the Invention

The present disclosure relates to a control apparatus of a radiation imaging apparatus, a control method of the same, and a radiation imaging system.

Description of the Related Art

A radiation image generated by a radiation imaging apparatus is transmitted to a control apparatus for medical image diagnosis or storage. If a period in which the radiation imaging apparatus reads out the radiation image and a period in which the radiation image is transmitted overlap with each other, the image quality of the radiation image is deteriorated due to the influence of the power supply voltage/ground potential fluctuation caused by the operation of a communication module or the influence of radio waves and radiation noise caused by an communication operation. Japanese Patent Laid-Open No. 2006-87566 proposes to transmit an image so as not to overlap with an image readout period. Japanese Patent Laid-Open No. 2006-247102 proposes to stop the operation of a communication module during an image readout period.

In order to completely separate the image readout period from the image transmission period, the time from the start of readout of one image to the start of its transmission becomes long. Therefore, with such a method, the frame rate decreases when imaging a moving image in which a plurality of images are generated and transmitted. One aspect of the present disclosure provides a technique for suppressing a deterioration in image quality caused by image transmission while suppressing a decrease in frame rate.

SUMMARY OF THE INVENTION

According to an embodiment, a control apparatus of a radiation imaging apparatus configured to generate a plurality of radiation images to transmit to an external apparatus is provided. The control apparatus includes an acquisition unit configured to acquire a generation cycle of the plurality of radiation images, a partial readout time required for the radiation imaging apparatus to read out a region of interest in one radiation image of the plurality of radiation images, and a transmission time estimated to be required to transmit the one radiation image. The control apparatus also includes a determination unit configured to determine, based on the generation cycle, the partial readout time, and the transmission time, a time at which the radiation imaging apparatus starts transmission of the plurality of radiation images. According to another embodiment, a method of controlling a radiation imaging apparatus configured to generate a plurality of radiation images to transmit to an external apparatus is provided. The method comprises: acquiring a generation cycle of the plurality of radiation images, a partial readout time required for the radiation imaging apparatus to read out a region of interest in one radiation image of the plurality of radiation images, and a transmission time estimated to be required to transmit the one radiation image; and determining, based on the generation cycle, the partial readout time, and the transmission time, a time at which the radiation imaging apparatus starts transmission of the plurality of radiation images.

Further features of the present invention will become apparent from the following description of exemplary embodiments (with reference to the attached drawings).

DESCRIPTION OF THE EMBODIMENTS

Figure 1:
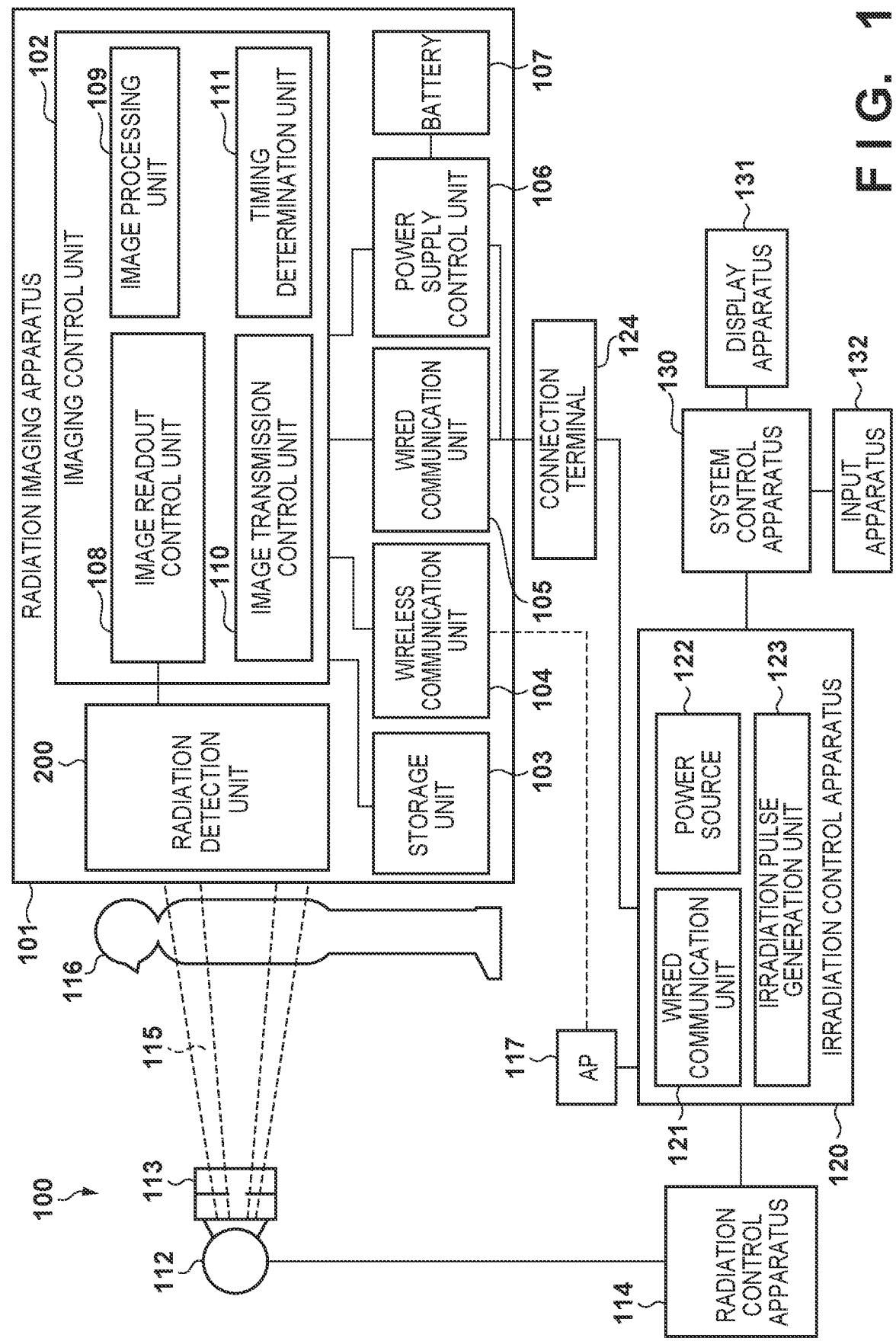
FIG. 1 is a block diagram for explaining a configuration example of a radiation imaging system according to an embodiment of the present disclosure.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

With reference to FIG. 1, a configuration example of a radiation imaging system 100 according to some embodiments will be described. In this specification, radiation includes X-rays, α-rays, β-rays, γ-rays, and various types of particle beams. The radiation imaging system 100 includes a radiation imaging apparatus 101, an irradiation control apparatus 120, and a system control apparatus 130.

The radiation imaging apparatus 101 is an apparatus that generates a radiation image of an object 116 based on radiation 115 emitted from a radiation source 112 and transmitted through the object 116. The radiation imaging apparatus 101 may be a radiation imaging apparatus using, for example, an FPD (Flat Panel Detector).

The radiation imaging apparatus 101 includes a radiation detection unit 200 and an imaging control unit 102. The radiation detection unit 200 generates image data according to the emitted radiation. The imaging control unit 102 includes an image readout control unit 108, an image processing unit 109, an image transmission control unit 110, and a timing determination unit 111. The image readout control unit 108 controls the drive timing of the radiation detection unit 200, readout of an image from the radiation detection unit 200, and the like. The image processing unit 109 performs various types of processing operations on a digital image acquired from the radiation detection unit 200. For example, the image processing unit 109 performs image processing including correction processing for correcting a defective pixel and an offset component of the image and processing for reducing various kinds of noise. The image transmission control unit 110 controls transmission of the acquired image. The timing determination unit 111 determines the execution timings of readout and transmission of the image.

The radiation imaging apparatus 101 includes a wireless communication unit 104 and a wired communication unit 105, and performs command communication, radiation synchronization control communication, and image data transmission using one or both of the communication units. The imaging control unit 102 checks whether a wired cable is connected to a connection terminal 124 to determine whether wired communication is possible. Image data processed by the imaging control unit 102 is transmitted to an external apparatus such as the system control apparatus 130. The external apparatus receives the image data.

The radiation imaging apparatus 101 includes a power supply control unit 106 capable of switching between power supply from a built-in battery 107 and power supply from the wired cable. The power supply control unit 106 can receive power supply via the wired cable during wired connection. The battery 107 may be configured as a battery detachable from the radiation imaging apparatus 101, or may be configured as a battery or a capacitor that can be charged by receiving power supply from the outside.

The imaging control unit 102 determines the operation of the radiation detection unit 200 from imaging conditions such as the imaging order and imaging mode set by the system control apparatus 130, and drives the radiation detection unit 200. Further, when an imaging request signal is received from the irradiation control apparatus 120, the imaging control unit 102 executes imaging of a moving image and a still image while synchronizing with the irradiation control apparatus 120. The image data acquired by the imaging undergoes necessary processing in the image processing unit 109, and then is stored in a storage unit 103 and/or transmitted to an external apparatus (for example, the system control apparatus 130).

The system control apparatus 130 is an apparatus that controls the overall operation of the radiation imaging system 100, acquisition and setting of various types of imaging conditions such as imaging protocols, and the like, and performs processing and display of image data acquired by imaging in the radiation imaging apparatus 101. The system control apparatus 130 may be implemented by various types of computers or workstations. The system control apparatus 130 may be connected with a display apparatus 131 such as a display for displaying a control menu or image data acquired by imaging, or an input apparatus 132 such as a mouse or keyboard for performing various types of inputs.

The radiation source 112 is formed by, for example, an electron gun for generating the radiation 115 such as X-rays, and a rotor. When electrons collide with the rotor while being accelerated by the high voltage generated by a radiation control apparatus 114, X-rays are generated. Further, by narrowing the irradiation range by a collimator 113, the necessary region alone is irradiated with X-rays. In addition, the radiation control apparatus 114 may be connected with a switch such as an irradiation switch or a fluoroscopic pedal for requesting radiation imaging, or an operation unit for setting radiation irradiation conditions or the like.

The irradiation control apparatus 120 is configured as an interface apparatus connected to the radiation imaging apparatus 101, the system control apparatus 130, and the radiation control apparatus 114. The irradiation control apparatus 120 synchronizes the image acquisition timing of the radiation imaging apparatus 101 and the radiation irradiation timing of the radiation control apparatus 114. In addition, the irradiation control apparatus 120 may be connected to the system control apparatus 130 by Ethernet® or the like and function as a relay apparatus upon transmitting image data acquired by the radiation imaging apparatus 101 to the system control apparatus 130. The irradiation control apparatus 120 includes a wired communication unit 121 that controls communication with the radiation imaging apparatus 101, a power source 122 that enables power supply to the radiation imaging apparatus, and an irradiation pulse generation unit 123 that issues an irradiation request to the radiation control apparatus 114.

Communication between the radiation imaging apparatus 101 and the irradiation control apparatus 120 is performed by a wireless LAN via an access point (denoted as AP in FIG. 1) 117. Instead, communication between the radiation imaging apparatus 101 and the irradiation control apparatus 120 may be direct communication in which either the radiation imaging apparatus 101 or the irradiation control apparatus 120 serves as an access point. Alternatively, this communication may comply with another wireless communication scheme such as Bluetooth®. In addition, the radiation imaging apparatus 101 and the irradiation control apparatus 120 can perform wired cable connection (for example, Ethernet connection) using the connection terminal 124.

Figure 2:
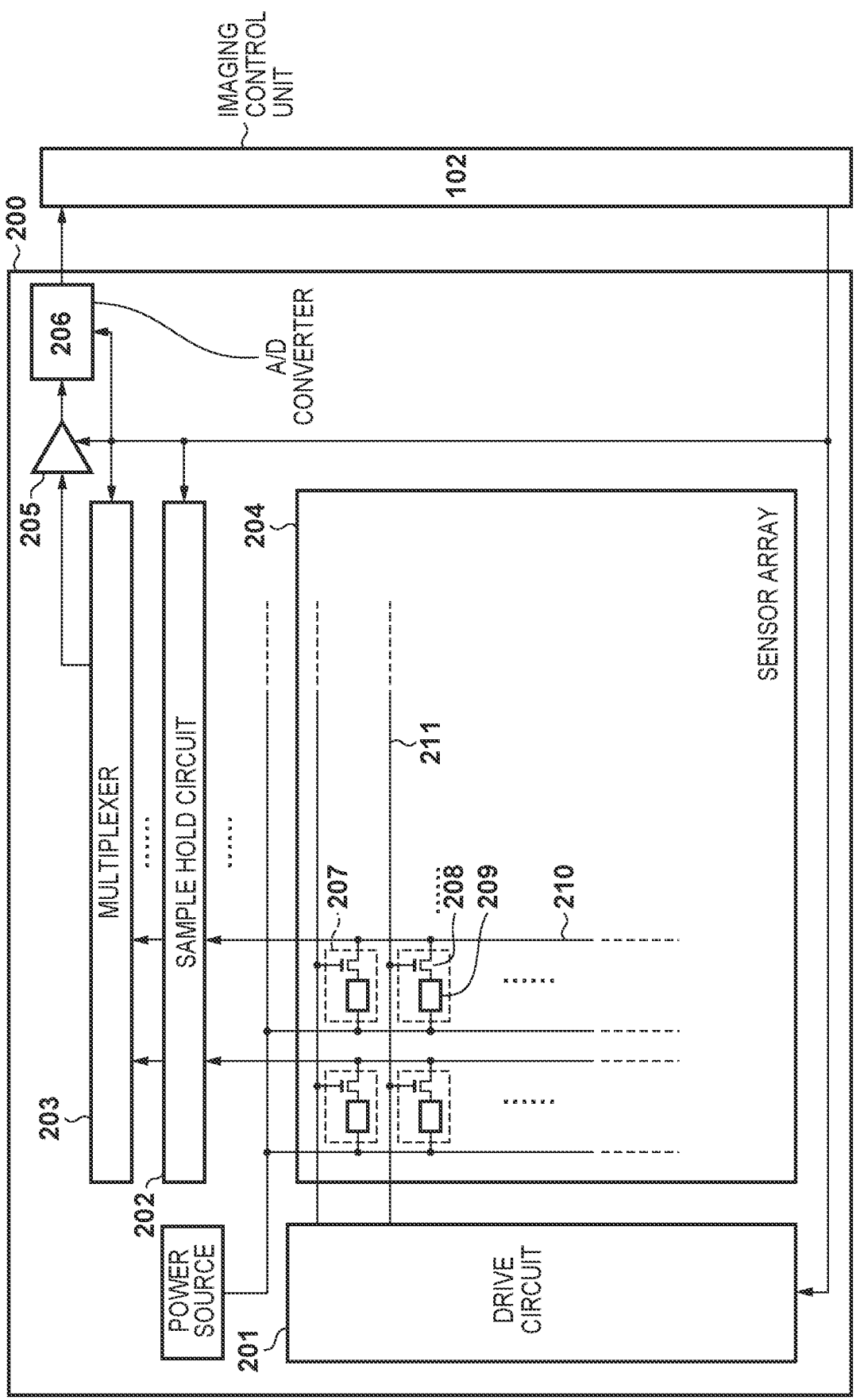
FIG. 2 is a block diagram for explaining an arrangement example of a radiation imaging apparatus according to the embodiment of the present disclosure.

With reference to FIG. 2, an arrangement example of the radiation detection unit 200 will be described. The radiation detection unit 200 includes a sensor array 204. The sensor array 204 is formed by a plurality of pixels 207 arrayed in a two-dimensional array so as to form a plurality of rows and a plurality of columns. Each pixel 207 on the sensor array 204 is formed by a switch element 208 such as an TFT and a photoelectric conversion element 209. For example, a scintillator is provided on each pixel 207. Radiation having entered the radiation detection unit 200 is converted into visible light by the scintillator, and this visible light enters the photoelectric conversion element 209 of each pixel. In the photoelectric conversion element 209, electric charges corresponding to the visible light are generated. In this embodiment, the scintillator and the photoelectric conversion element described above form a conversion element that convers radiation into electric charges. Instead, for example, a so-called direct conversion type conversion element that directly converts radiation into electric charges may be arranged without providing the scintillator. A radiation image is acquired by switching between accumulation of the electric charges and readout of the electric charges by switching ON/OFF of the switch element 208.

The plurality of pixels arranged in the row direction (the horizontal direction in FIG. 2) are called a pixel row. One drive line 211 is arranged for each pixel row. When a voltage for turning on the switch element 208 is applied to one drive line 211, the switch element 208 of each pixel 207 in the pixel row corresponding to this drive line 211 is turned on. Accordingly, the electric charges accumulated in the photoelectric conversion element 209 of each pixel 207 in this pixel row are held in a sample hold circuit 202 through a corresponding signal line 210. After that, the electric charges held in the sample hold circuit 202 are sequentially read out via a multiplexer 203, amplified by an amplifier 205, and then converted into digital value image data by an A/D converter 206. For the pixel row with which readout of the electric charges has been completed, a voltage for turning off the switch element 208 is applied to the drive line 211 by a drive circuit 201. This causes each pixel 207 in this pixel row to start accumulation of electric charges. In this manner, the drive circuit 201 sequentially scans each pixel row on the sensor array 204, so that electric charges from all the pixels 207 are converted into digital values. Thus, radiation image data is generated. The drive circuit 201, the sample hold circuit 202, and the multiplexer 203 are controlled by the image readout control unit 108 in the imaging control unit 102. The sample hold circuit 202, the multiplexer 203, and the amplifier 205 form a readout circuit.

Figure 3:
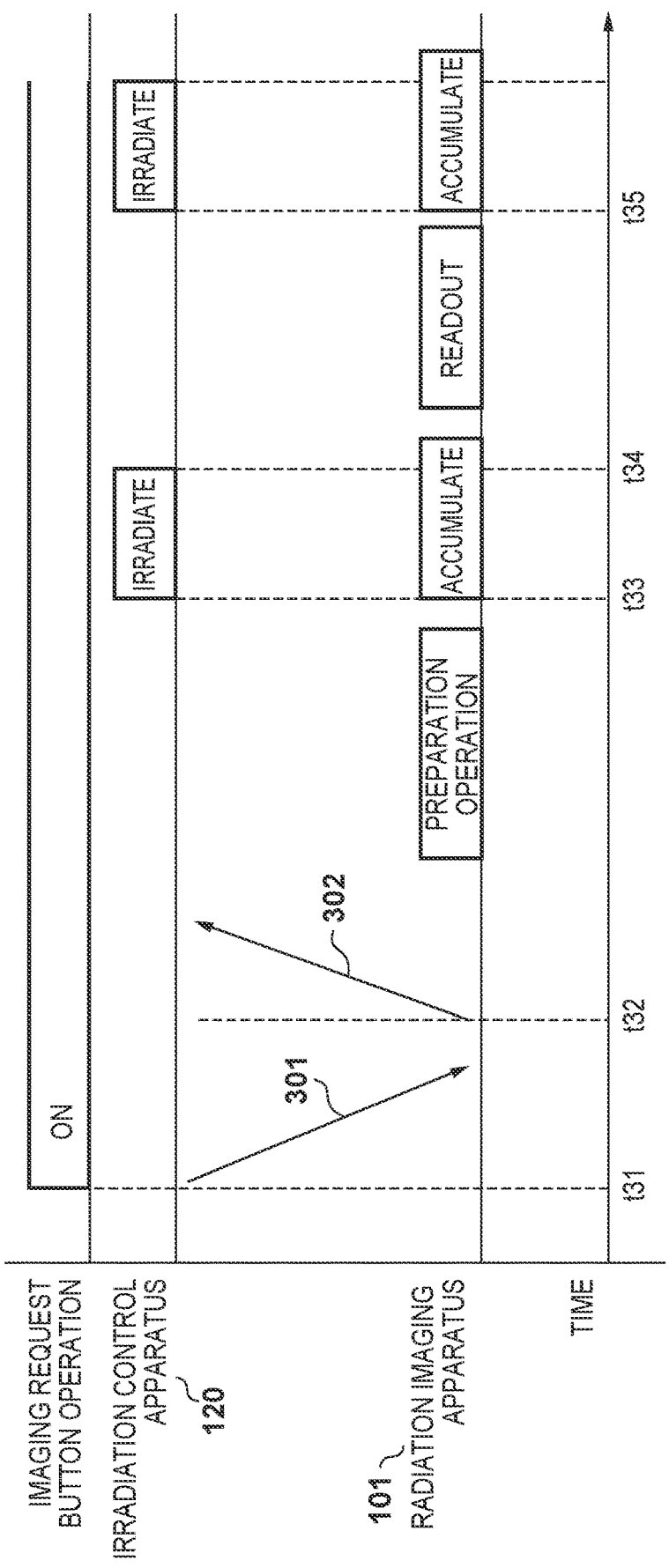
FIG. 3 is a schematic view for explaining an operation example of the radiation imaging system according to the embodiment of the present disclosure.

Next, with reference to FIG. 3, a synchronization method between the radiation imaging apparatus 101 and the irradiation control apparatus 120 at the time of imaging will be described. The synchronization method can employ a plurality of methods. A case of imaging a moving image while utilizing time synchronization will be described below. Each of the radiation imaging apparatus 101 and the irradiation control apparatus 120 includes an internal timer, and these internal timers are synchronized in advance. This synchronization may be performed using a time synchronization protocol described in IEEE1588, or may be performed using a unique synchronization message. Since both internal timers are synchronized, only one time axis is shown in FIG. 3.

When an imaging request button is pressed by an operator at time t31, the irradiation control apparatus 120 transmits an imaging request 301 to the radiation imaging apparatus 101 as a packet message by wired communication or wireless communication. In response to the imaging request, the radiation imaging apparatus 101 determines the planned imaging start time based on the current standby state of the radiation imaging apparatus 101. The planned imaging start time is determined to be the time after a lapse of a sufficient time for exchanging messages and performing a preparation operation of the radiation imaging apparatus 101 but close enough so as not to keep the user waiting unnecessarily and reduce the operational feeling. In this example, the radiation imaging apparatus 101 determines the planned imaging start time to be time t33.

At time t32, the radiation imaging apparatus 101 transmits an imaging permission message 302 including the above-mentioned planned imaging start time as a parameter. The imaging permission message 302 may include the length (for example, 10 windows) of a radiation pulse and a frame rate (for example, 30 cycles). Instead, the length of the radiation pulse and the frame rate may be set in advance. The imaging permission message may further include another parameter. The radiation imaging apparatus 101 performs a preparation operation between time t32 and time t33. When the preparation operation is completed, the radiation imaging apparatus 101 can perform radiation imaging.

At time t33, the irradiation control apparatus 120 starts to generate a radiation irradiation timing pulse. A moving image can be imaged by repeatedly performing irradiation in accordance with the designated length of the radiation pulse and the frame rate information. On the other hand, at time t33, the radiation imaging apparatus 101 starts an electric charge accumulation operation. Then, after a time corresponding to the length of the radiation pulse has elapsed (that is, after time t34), the radiation imaging apparatus 101 starts a readout operation. By this readout operation, the electric charges accumulated in each pixel 207 of the sensor array 204 are read out and radiation image data is generated. Thereafter, at time t35, radiation irradiation for generating a next frame is performed. The length from time t33 to time t35 is determined by the frame rate.

In this manner, by performing synchronization between the readout operation and the radiation irradiation based on the time synchronized in advance, it becomes unnecessary to synchronize the irradiation time for each frame using a message on a packet network. Therefore, it is possible to image a moving image at stable timings without being affected by a delay or loss of the message.

In the above description, imaging of a moving image utilizing time synchronization in the packet network has been described as an example, but the synchronization method is not limited to this. When the influence of a delay or loss of the message between the radiation imaging apparatus 101 and the irradiation control apparatus 120 is allowable, the radiation imaging apparatus 101 may notify the irradiation control apparatus 120 of a radiation irradiation request message. Instead, the irradiation control apparatus 120 may take the initiative and transmit a synchronization message to the radiation imaging apparatus 101 to read out an image at the timing when the radiation irradiation pulse ends. In addition, instead of the communication by the packet network such as Ethernet or a wireless LAN, a dedicated synchronization signal line may be used to synchronize the moving image imaging operation.

Figure 4:
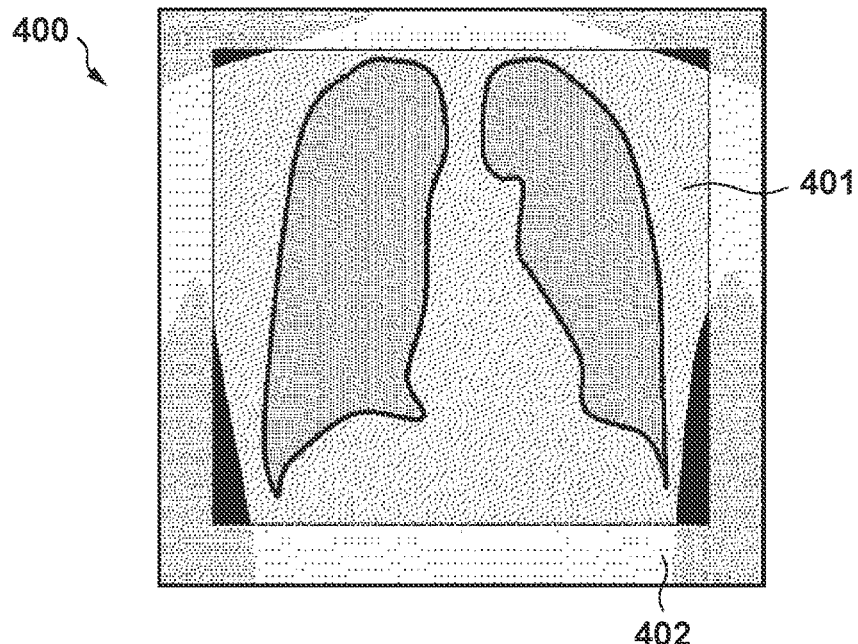
FIG. 4 is a schematic view for explaining a region of interest of a radiation image.

With reference to FIG. 4, an example of a radiation image generated by the radiation imaging system 100 will be described. A radiation image 400 includes a region 401 of interest in a part (an inner part in the example shown in FIG. 4) thereof. The region of the radiation image 400 other than the region 401 of interest is referred to as a region 402 of non-interest. The region 401 of interest is a region of the radiation image 400 set by the user of the radiation imaging system 100 for detailed observation. This setting may be performed before imaging a moving image, or may be changed during imaging the moving image. The region 401 of interest may be set for each imaging technique or protocol. The region 401 of interest may be defined based on the aperture information of the collimator 113. The setting of the region 401 of interest may be stored in the storage unit 103 of the radiation imaging apparatus 101. The region 402 of non-interest is not required to have high image quality as compared with the region 401 of interest, so that the irradiation amount may be set low.

Figure 5A:
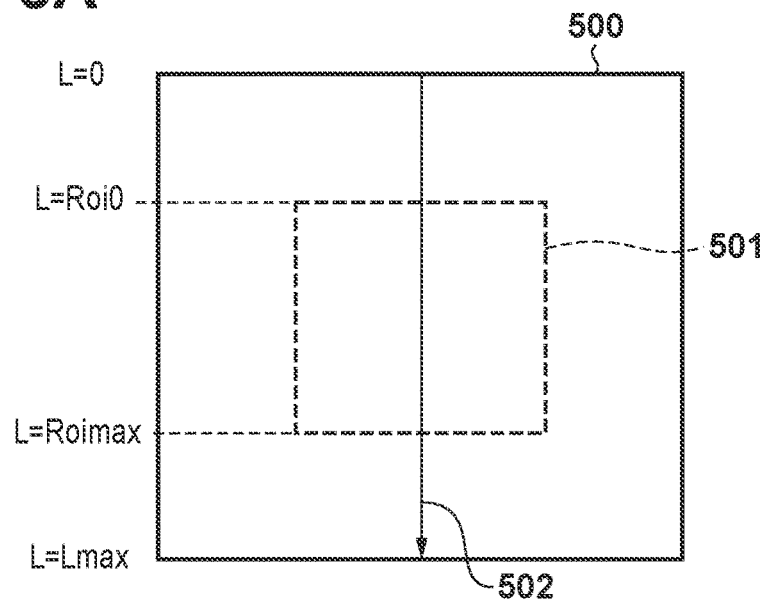
FIGS. 5A and 5B are schematic views for explaining an example of readout of a radiation image according to the embodiment of the present disclosure.
Figure 5B:
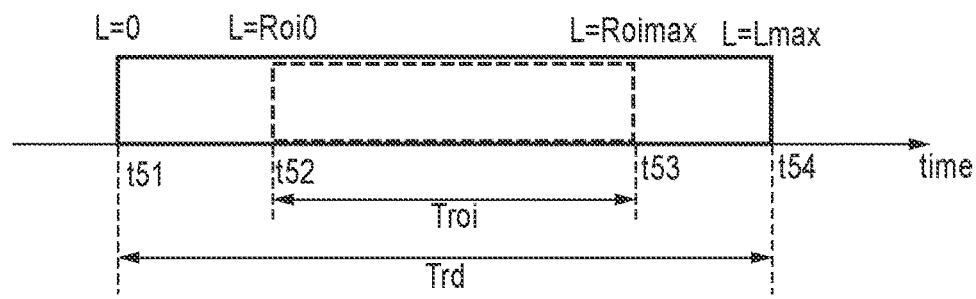

With reference to FIGS. 5A and 5B, the details of readout of a radiation image will be described. FIG. 5A shows an example of one radiation image, and FIG. 5B shows the readout period thereof. As shown in FIG. 5A, a radiation image 500 includes a region 501 of interest inside. The radiation image 500 is read out by the radiation imaging apparatus 101 for each pixel row in the order indicated by an arrow 502. More specifically, at time t51, the radiation imaging apparatus 101 starts to read out the radiation image 500 from the pixel row (top row) indicated by "L=0". Then, the radiation imaging apparatus 101 shifts the pixel row subject to readout row by row in the direction of the arrow 502. After that, at time t52, readout (of image data) for the region 501 of interest is started from the pixel row indicated by "L =Roi0". At time t53, the readout for the region 501 of interest is completed at the pixel row indicated by "L=Roimax". Finally, at time t54, the radiation imaging apparatus 101 completes the readout of the radiation image 500 at the pixel row indicated by "L=Lmax".

It may be considered that readout of the pixel row subject to readout is completed when the electric charge signals from all the pixels of this pixel row have changed to a state in which they are less susceptible to noise. For example, it may be considered that readout of the pixel row subject to readout is completed when the electric charge signals from all the pixels of this pixel row are converted into digital data by the A/D converter 206.

The length of the period (the period from time t51 to time t54 in the example shown in FIG. 5B) required for the radiation imaging apparatus 101 to read out one radiation image 500 is referred to as a total readout time Trd. The length of the period (the period from time t52 to time t53 in the example shown in FIG. 5B) required for the radiation imaging apparatus 101 to read out one radiation image 500 for the region 501 of interest is referred to as a partial readout time Troi. In this specification, a "period" refers to a specific range on the time axis. The total readout time Trd is calculated by multiplying the number of pixel rows of one radiation image 500 by the clock cycle of the drive circuit 201. The partial readout time Troi is calculated by multiplying the number of pixel rows of the region 501 of interest of one radiation image 500 by the clock cycle of the drive circuit 201.

Next, with reference to FIG. 6, the relationship between the readout periods of a plurality of radiation images and the transmission periods of the plurality of radiation images will be described. The radiation imaging apparatus 101 continuously generates and transmits a plurality of radiation images. For example, the plurality of radiation images may be a plurality of frames that form a moving image. The generation cycle of the plurality of radiation images is referred to as Tcyc. The generation cycle Tcyc matches, for example, the interval of the radiation irradiation start time (for example, the length from time t61 to time t66). The generation cycle Tcyc is also the reciprocal of the frame rate of the moving image. The generation cycle Tcyc is set for each imaging mode. The generation cycle Tcyc may be stored in the storage unit 103 of the radiation imaging apparatus 101.

The transmission time estimated to be required for the radiation imaging apparatus 101 to transmit one radiation image to an external apparatus (for example, the system control apparatus 130) is referred to as Tsd. The transmission time Tsd is estimated based on the data size of the radiation image 500, the performance of the communication unit of the radiation imaging apparatus 101, and the line status (for example, the radio field intensity in the case of wireless communication).

Figure 6:
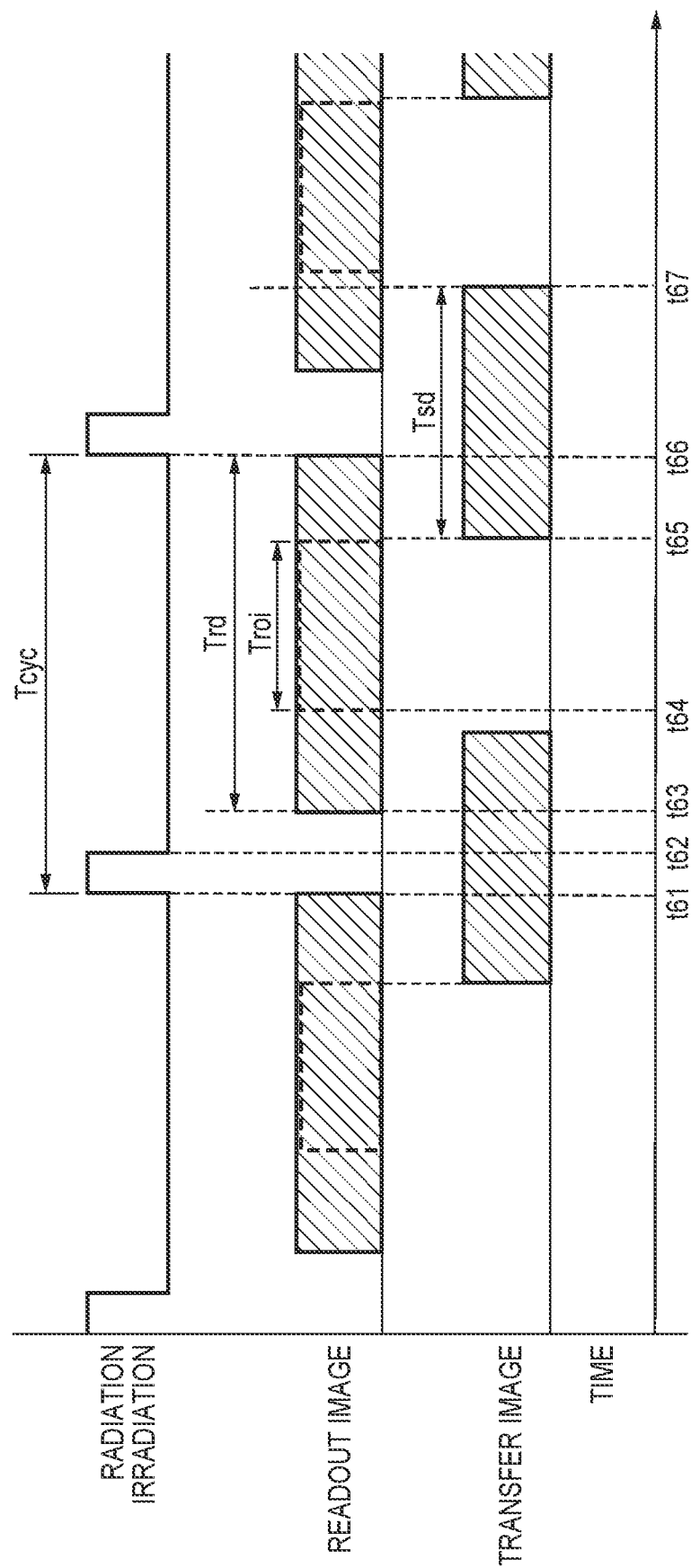
FIG. 6 is a timing chart for explaining an operation example of the radiation imaging apparatus according to the embodiment of the present disclosure.

In FIG. 6, a case in which the transmission time Tsd is larger than the value obtained by subtracting the total readout time Trd from the generation cycle Tcyc but smaller than the value obtained by subtracting the partial readout time Troi from the generation cycle Tcyc will be described.

That is, Tcyc−Trd<Tsd<Tcyc−Troi holds. In this case, the radiation imaging apparatus 101 cannot transmit the plurality of radiation images such that the readout period of each of the plurality of radiation images and the transmission period of each of the plurality of radiation images do not overlap with each other. However, the radiation imaging apparatus 101 can transmit the plurality of radiation images such that the readout period of the region of interest of each of the plurality of radiation images and the transmission period of each of the plurality of radiation images do not overlap with each other. Therefore, so as not to generate noise caused by transmission of the radiation image during readout for the region of interest, the radiation imaging apparatus 101 transmits the radiation image during the period in which the image of the region of interest is not read out. The specific operation will be described below.

From time t61 to time t62, radiation is emitted from the radiation source 112, and in this period, each pixel 207 of the radiation imaging apparatus 101 generates and accumulates electric charges according to the radiation dose. After the radiation irradiation is completed, the radiation imaging apparatus 101 starts to read out a radiation image from time t63. The readout of the radiation image for the region of interest is started at time t64, and the readout for the region of interest is completed at time t65. When the readout for the region of interest is completed, the radiation imaging apparatus 101 starts to transmit the radiation image whose readout has started at time t63. This transmission of the radiation image is completed at time t67 before readout of a next radiation image for the region of interest is started. In this example, the leading side and the trailing side of the transmission of the radiation image respectively overlap with the readout operations of the radiation images, but the middle part of the transmission of the radiation image does not overlap with the readout operations of the radiation images. The transmission of the radiation image may be started immediately after the completion of readout of the radiation image for the region of interest. Instead, the transmission of the radiation image may be started some time after the completion of readout of the radiation image for the region of interest, as long as the transmission is completed before the start of readout of the next radiation image for the region of interest.

The radiation image read out for each pixel row may undergo offset correction in the image processing unit 109 using an offset image read out in advance in a state in which no radiation irradiation is performed. Further, image processing such as gain correction and defect correction may be performed on the radiation image. The radiation image is transmitted after these image processing operations are performed.

When the region of non-interest is an invalid region in the imaging mode and not to be used, or when the region of non-interest is not to be used because it is a region narrowed by the collimator, only the region of interest of the radiation image may be transmitted. Instead, the entire radiation image may be transmitted, and the system control apparatus 130 may cut out the region of non-interest before displaying the radiation image.

As has been described above, the radiation imaging apparatus adjusts the readout period and the transmission period of the radiation image based on the generation cycle Tcyc, the partial readout time Troi, the total readout time Trd, and the transmission time Tsd. This makes it possible to improve the frame rate while suppressing a deterioration in image quality of the region of interest of the radiation image.

Figure 7:
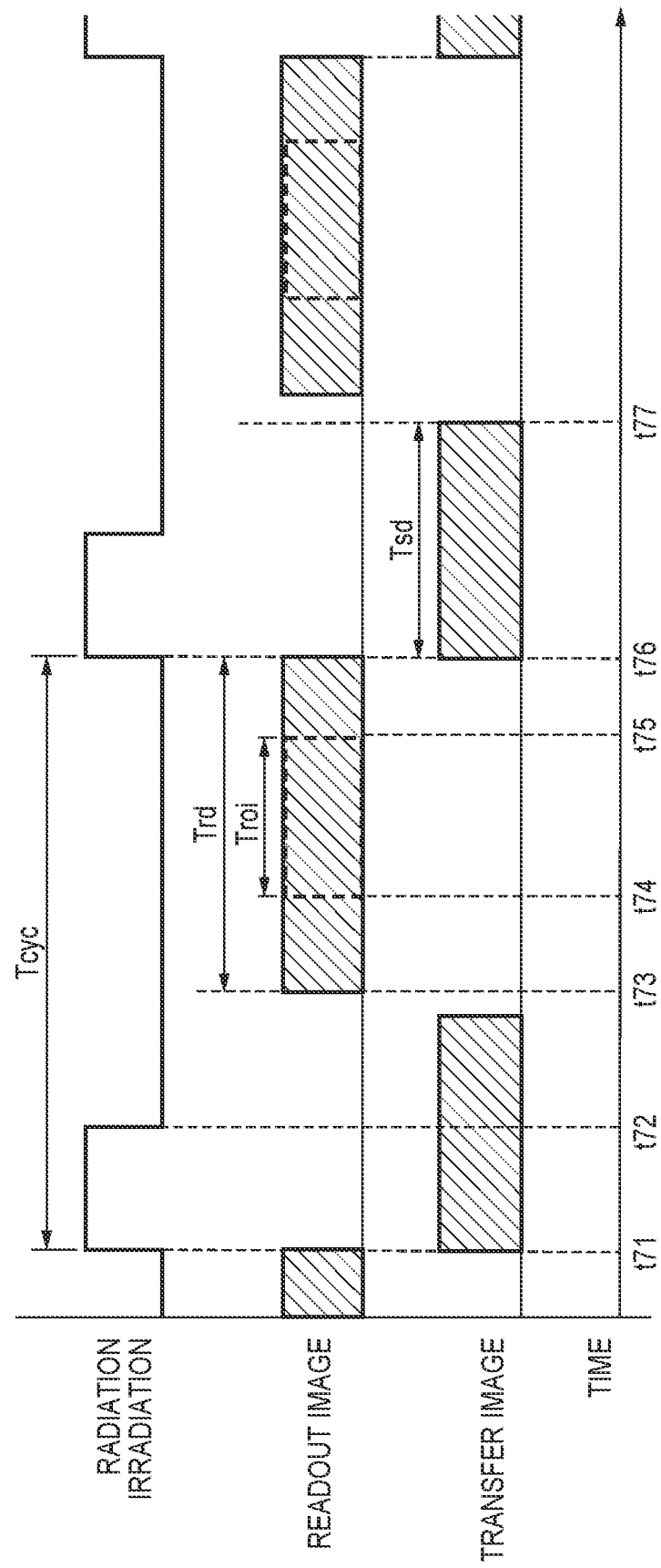
FIG. 7 is a timing chart for explaining another operation example of the radiation imaging apparatus according to the embodiment of the present disclosure.

In FIG. 7, a case in which the transmission time Tsd is smaller than the value obtained by subtracting the total readout time Trd from the generation cycle Tcyc (that is, Tcyc−Trd>Tsd) will be described. In this case, the radiation imaging apparatus 101 can transmit a plurality of radiation images such that the readout period of each of the plurality of radiation images and the transmission period of each of the plurality of radiation images do not overlap with each other. The specific operation will be described below.

From time t71 to time t72, radiation is emitted from the radiation source 112, and in this period, each pixel 207 of the radiation imaging apparatus 101 generates and accumulates electric charges according to the radiation dose. After the radiation irradiation is completed, the radiation imaging apparatus 101 starts to read out a radiation image from time t73. The readout of the radiation image for the region of interest is started at time t74, and the readout for the region of interest is completed at time t75. After that, at time t76, the radiation imaging apparatus 101 completes readout of the entire radiation image. When the readout of the radiation image is completed, the radiation imaging apparatus 101 starts to transmit the radiation image whose readout has started at time t73. This transmission of the radiation image is completed at time t77 before readout of a next radiation image is started. The transmission of the radiation image may be started immediately after the completion of readout of the radiation image. Instead, the transmission of the radiation image may be started some time after the completion of the readout of the radiation image, as long as the transmission is completed before the start of readout of the next radiation image.

Even when the plurality of radiation images can be transmitted as in the example shown in FIG. 7, the radiation imaging apparatus 101 may transmit the plurality of radiation images such that the readout period of the non-interest region of each of the plurality of radiation images and the transmission period of each of the plurality of radiation images overlap with each other.

Figure 8:
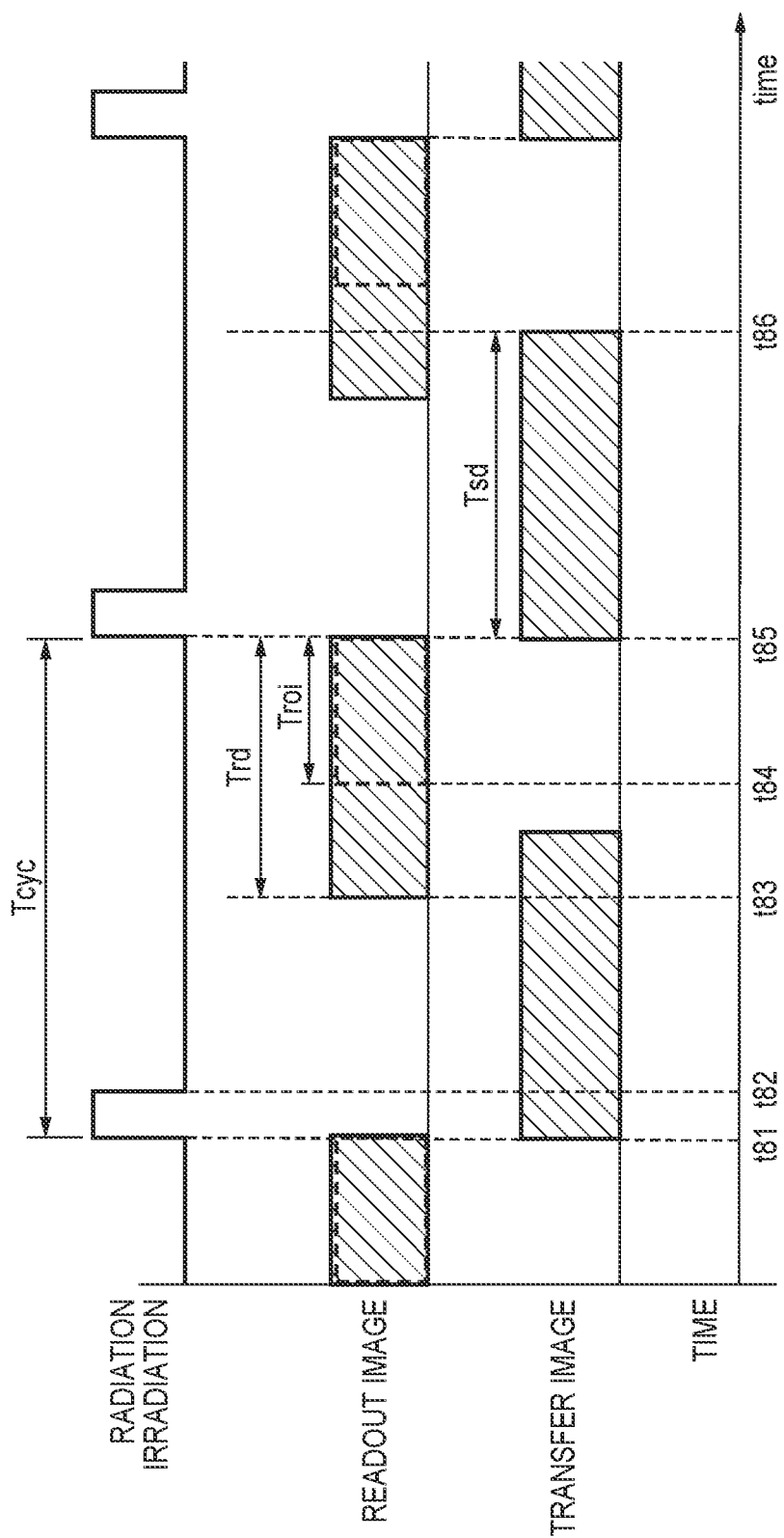
FIG. 8 is a timing chart for explaining still another operation example of the radiation imaging apparatus according to the embodiment of the present disclosure.

With reference to FIG. 8, a case in which the region of interest of a radiation image is not located in the center (for example, the region of interest is in contact with the lower end of the radiation image) will be described. Also in the example shown in FIG. 8, it is assumed that Tcyc−Trd<Tsd<Tcyc−Troi holds. Therefore, the radiation imaging apparatus 101 transmits the radiation image during the period in which the image of the region of interest is not read out. The specific operation will be described below.

From time t81 to time t82, radiation is emitted from the radiation source 112, and in this period, each pixel 207 of the radiation imaging apparatus 101 generates and accumulates electric charges according to the radiation dose. After the radiation irradiation is completed, the radiation imaging apparatus 101 starts to read out a radiation image from time t83. The readout of the radiation image for the region of interest is started at time t84, and the readout for the region of interest is completed at time t85. When the readout for the region of interest is completed, the readout of the radiation image is also completed. When the readout for the region of interest is completed, the radiation imaging apparatus 101 starts to transmit the radiation image whose readout has started at time t83. This transmission of the radiation image is completed at time t86 before readout a next radiation image of for region of interest is started. In this example, the leading side of the transmission of the radiation image does not overlap with the readout of the radiation image, but the trailing side of the transmission of the radiation image overlaps with the readout of the next radiation image. The transmission of the radiation image may be started immediately after the completion of readout of the radiation image for the region of interest. Instead, the transmission of the radiation image may be started some time after the completion of the readout of the radiation image for the region of interest, as long as the transmission is completed before the start of readout of the next radiation image for the region of interest.

Figure 9:
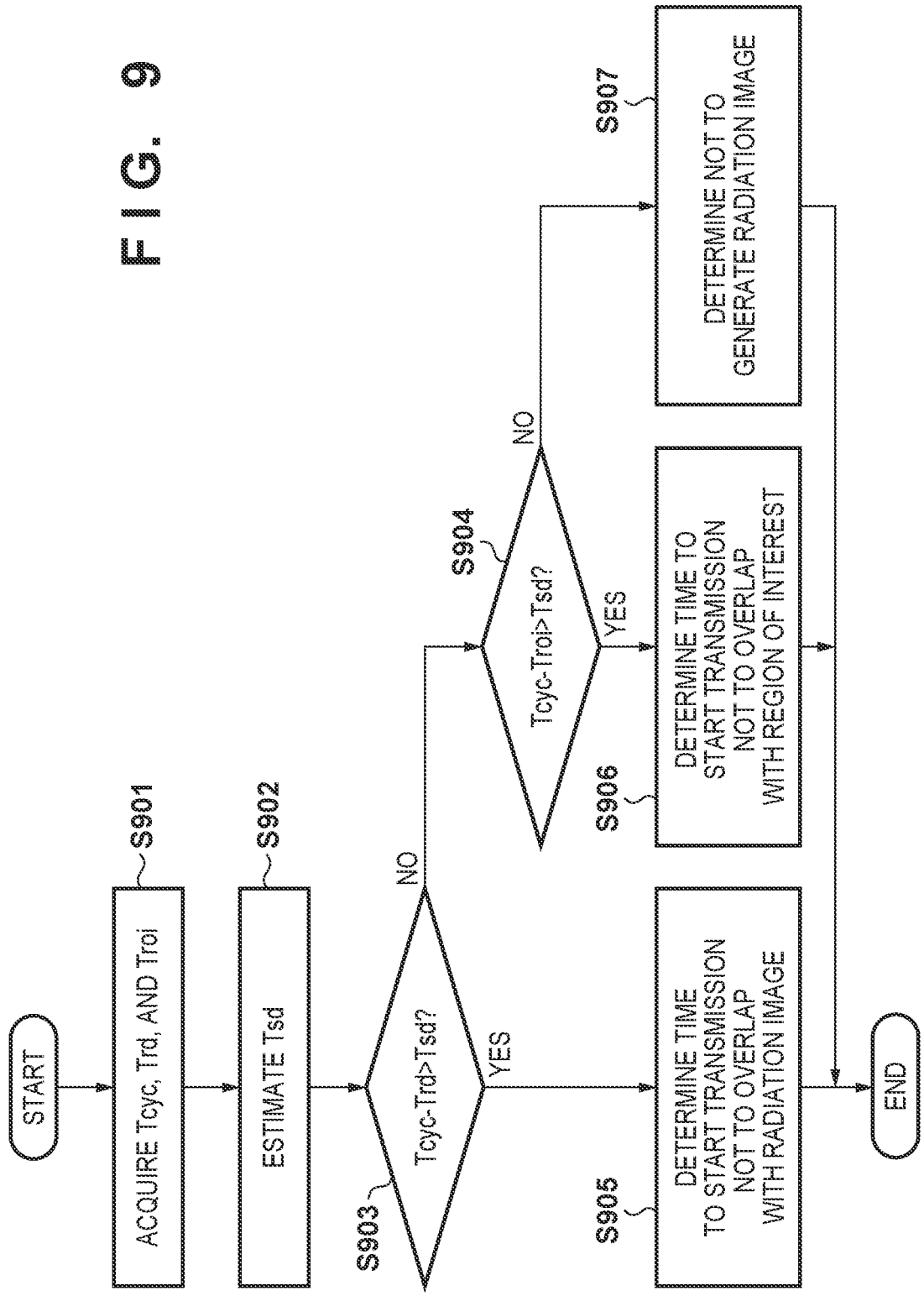
FIG. 9 is a flowchart for explaining an operation example of a control apparatus according to the embodiment of the present disclosure.

With reference to FIG. 9, a method for determining the time to start transmission of each of the plurality of radiation images will be described. This method may be executed by the imaging control unit 102 of the radiation imaging apparatus 101. In this case, the imaging control unit 102 functions as the control apparatus of the radiation imaging apparatus 101. Instead, this method may be executed by an apparatus (for example, the system control apparatus 130) external to the radiation imaging apparatus 101. In this case, this external apparatus functions as the control apparatus of the radiation imaging apparatus 101. This method may be executed by a dedicated circuit such as an ASIC (Application Specific Integrated Circuit) or may be executed by one or more processors executing a program stored in a memory. In the former case, this dedicated circuit executes each step of the following method. In the latter case, the processor executes each step of the following method. Further, the dedicated circuit and the processor may cooperate to execute the following method. The following method is executed, for example, before generation of a plurality of radiation images (for example, a moving image). Further, the following method may be iteratively repeated during generation of the plurality of radiation images.

In step S901, the imaging control unit 102 acquires the generation cycle Tcyc of the plurality of radiation images, the total readout time Trd, and the partial readout time Troi. The generation cycle Tcyc is calculated, for example, based on the frame rate included in the imaging condition set in the system control apparatus 130. The total readout time Trd is calculated by multiplying the number of pixel rows of one radiation image 500 by the clock cycle of the drive circuit 201. The partial readout time Troi is calculated by multiplying the number of pixel rows of the region 501 of interest of one radiation image 500 by the clock cycle of the drive circuit 201.

In step S902, the imaging control unit 102 acquires the transmission time Tsd estimated to be required to transmit one radiation image 500 from the radiation imaging apparatus 101 to the irradiation control apparatus 120. For example, the imaging control unit 102 estimates the transmission time Tsd based on the data size of the radiation image 500, the performance of the communication unit of the radiation imaging apparatus 101, and the line status.

In step S903, the imaging control unit 102 determines whether Tcyc−Trd>Tsd holds. The imaging control unit 102 advances the process to step S905 if Tcyc−Trd>Tsd holds; otherwise, it advances the process to step S904. If this condition holds, as shown in the example shown in FIG. 7, the radiation imaging apparatus 101 can transmit the plurality of radiation images such that the readout period of each of the plurality of radiation images and the transmission period of each of the plurality of radiation images do not overlap with each other. Therefore, in step S905, the imaging control unit 102 determines the time to start transmission of each of the plurality of radiation images such that the readout period of each of the plurality of radiation images and the transmission period of each of the plurality of radiation images do not overlap with each other. The time determined here may be an absolute value (for example, x hour x minute x second) or a relative value (for example, x msec after completion of readout of each radiation image for the region of interest). The same applies to subsequent time determination.

In step S904, the imaging control unit 102 determines whether Tcyc−Troi>Tsd holds. The imaging control unit 102 advances the process to step S906 if Tcyc−Troi>Tsd holds; otherwise, it advances the process to step S907. If this condition holds, as shown in the example in FIG. 6, the radiation imaging apparatus 101 can transmit the plurality of radiation images such that the readout period of the region of interest of each of the plurality of radiation images and the transmission period of each of the plurality of radiation images do not overlap with each other. Therefore, in step S906, the imaging control unit 102 determines the time to start transmission of each of the plurality of radiation images such that the readout period of the region of interest of each of the plurality of radiation images and the transmission period of each of the plurality of radiation images do not overlap with each other. Since Tcyc−Trd≤Tsd holds, the time determined in step S906 is determined such that the readout period of the region other than the regions of interest of each of the plurality of radiation images and the transmission period of each of the plurality of radiation images overlap with each other.

On the other hand, if the condition in step S904 does not hold, the radiation imaging apparatus 101 cannot transmit the plurality of radiation images such that the readout period of the region of interest of each of the plurality of radiation images and the transmission period of each of the plurality of radiation images do not overlap with each other. Therefore, in step S907, the imaging control unit 102 determines not to generate the radiation image. For example, the imaging control unit 102 may notify the user that such imaging cannot be executed, or may disable selection of such an imaging mode.

After the transmission start time is determined by the method illustrated in FIG. 9, the radiation imaging apparatus 101 starts to generate and transmit the plurality of radiation images according to the determined time. If any one of Tcyc, Trd, Troi, and Tsd is changed during the generation and transmission of the plurality of radiation images, the radiation imaging apparatus 101 continues to generate and transmit the plurality of radiation images in accordance with a newly determined transmission start time. Note that depending on the changed values of these times, step S907 is executed and generation and transmission of the plurality of radiation images are stopped.

In the example shown in FIG. 9, if the equal sign holds in the conditional expression in each of steps S903 and S904, the process advances to the "NO" side. Instead, the process may advance to the "YES" side if the equal sign holds. Further, the determination order of steps S903 and S904 can be reversed.

In this embodiment, an image for offset correction (that is, an offset image) is generated in advance before generating the plurality of radiation images. Instead, the offset image may be read out after readout of the radiation image and before readout of the next radiation image. The region of interest may be set also in the offset image. In this case, similarly to the method described above, the radiation image having undergone the offset correction may be transmitted so as not to overlap with the readout of the offset image for the region of interest.

In the example shown in FIG. 9, the determination using the total readout time Trd is performed in step S903. Instead, the determination using the total readout time Trd may be omitted. Even when this determination is omitted, the transmission period of the radiation image can be prevented from overlapping with the readout period of the region of interest of the radiation image by executing step S904.

According to the embodiment described above, the time at which the radiation imaging apparatus 101 starts transmission of each of the plurality of radiation images is determined based on the generation cycle Tcyc, the partial readout time Troi, and the transmission time Tsd. Thus, the radiation image is not transmitted while the radiation image for the region of interest is read out. When the region of interest is set, the image quality of the radiation image is determined by the image quality of the region of interest. Therefore, according to this embodiment, a deterioration in image quality of the radiation image is suppressed. In addition, since the transmission of the radiation image is started without waiting for the completion of readout of the entire radiation image, a decrease in frame rate can be suppressed.

Figure 10:
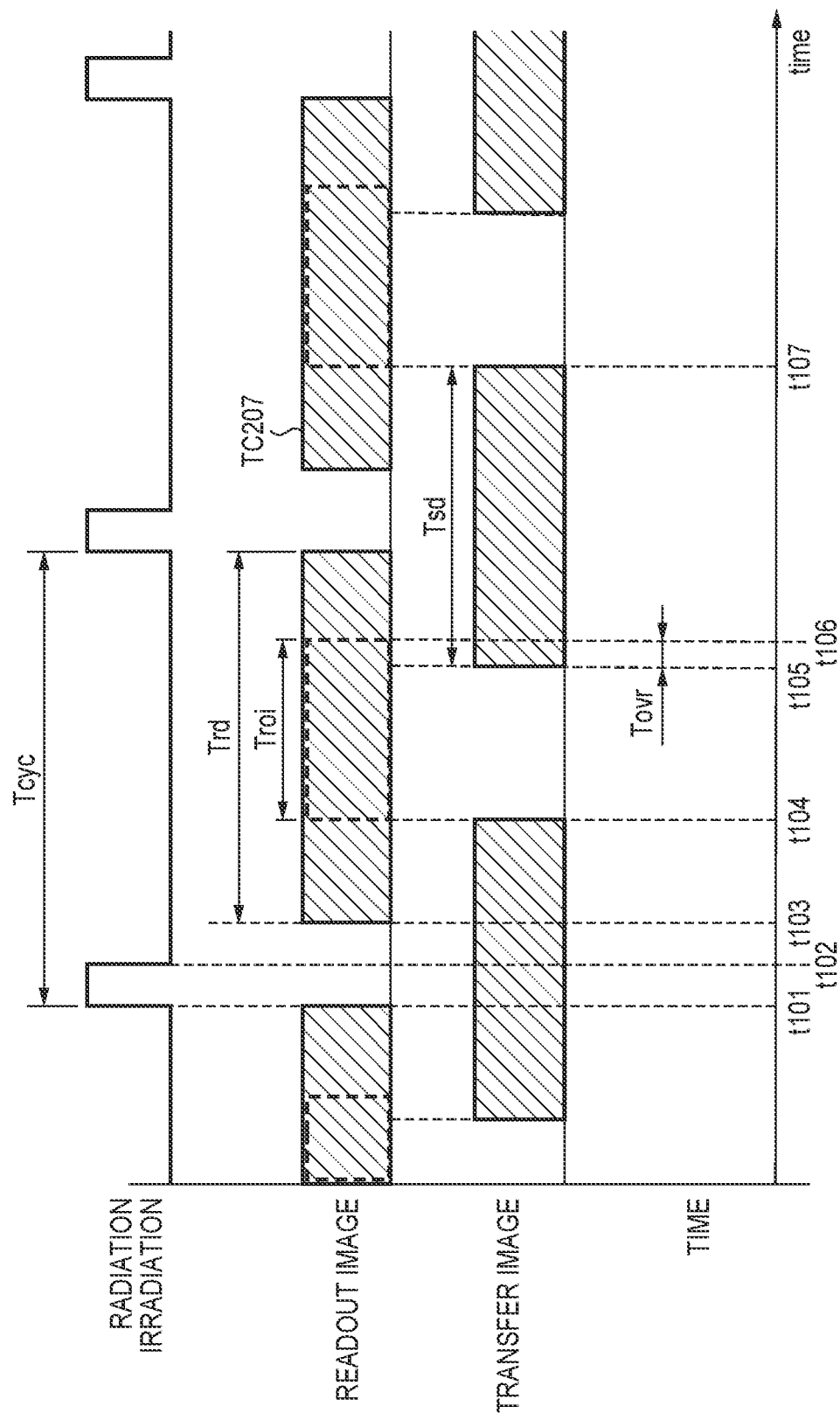
FIG. 10 is a timing chart for explaining still another operation example of the radiation imaging apparatus according to the embodiment of the present disclosure.

A modification of the above-described embodiment will be described with reference to FIG. 10. In the example shown in FIG. 9, if the plurality of radiation images cannot be transmitted such that the readout period of the region of interest of each of the plurality of radiation images and the transmission period of each of the plurality of radiation images do not overlap with each other, the imaging control unit 102 determines not to generate the radiation image. However, if the overlap between the readout period of the region of interest of each of the plurality of radiation images and the transmission period of each of the plurality of radiation images is small, a deterioration in image quality of the radiation image is considered to be small as well. Therefore, in this modification, the imaging control unit 102 generates the radiation image if the overlap is small. The specific operation will be described below.

From time t101 to time t102, radiation is emitted from the radiation source 112, and in this period, each pixel 207 of the radiation imaging apparatus 101 generates and accumulates electric charges according to the radiation dose. After the radiation irradiation is completed, the radiation imaging apparatus 101 starts to read out a radiation image from time t103. The readout of the radiation image for the region of interest is started at time t104. At time t105, the radiation imaging apparatus 101 starts to transmit the radiation image whose readout has started at time t103. Then, the readout for the region of interest is completed at time t106. The transmission of the radiation image is completed at time t107 at which readout of a next radiation image for the region of interest is started.

The time during which the transmission period of one radiation image and the readout period of each of the plurality of radiation images overlap with each other is referred to as Tovr. The overlap time Tovr may be located on the leading side, the trailing side, or both sides of the transmission period of the radiation image. The side on which the overlap time Tovr is located may be determined based on the importance of each part in the region of interest. If the overlap time Tovr is smaller than a threshold time Tth, the radiation imaging apparatus 101 generates the plurality of radiation images.

Figure 11:
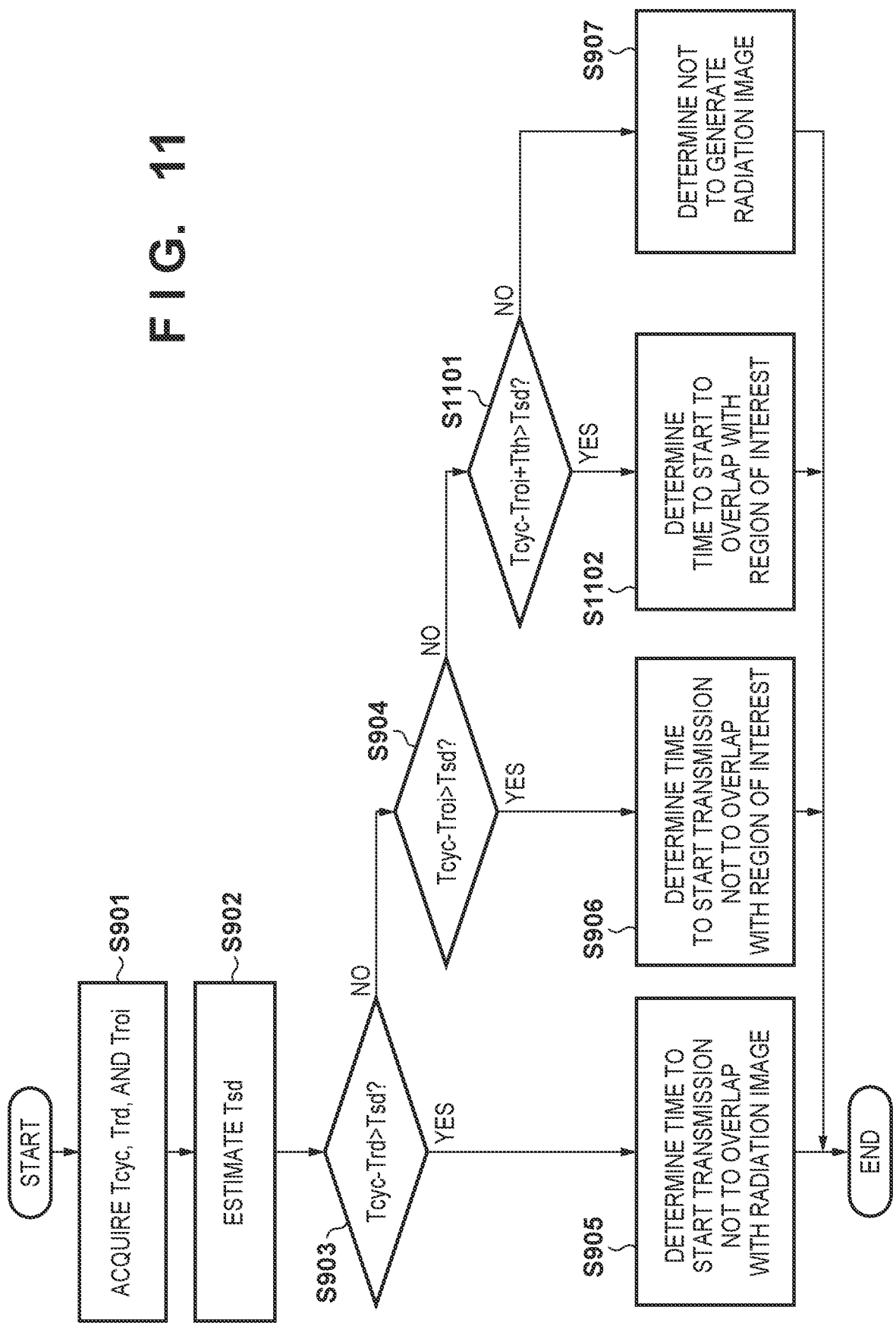
FIG. 11 is a flowchart for explaining another operation example of the control apparatus according to the embodiment of the present disclosure.

With reference to FIG. 11, a method for determining the time to start transmission of each of the plurality of radiation images in this modification will be described. Steps S901 to S903 and S905 to S907 are similar to those described with reference to FIG. 9, so that the description thereof will be omitted. If it is determined that the condition in step S904 does not hold, the imaging control unit 102 advances the process to step S1101.

In step S1101, the imaging control unit 102 determines whether Tcyc+Tth−Troi>Tsd holds. The imaging control unit 102 advances the process to step S1102 if Tcyc+Tth−Troi>Tsd holds; otherwise, it advances the process to step S907. If this condition holds, as shown in the example in FIG. 10, the radiation imaging apparatus 101 can set the overlap time Tovr between the transmission period of one radiation image and the readout period of the region of interest of each of the plurality of radiation images to be smaller than the threshold time Tth. Therefore, in step S1102, the imaging control unit 102 determines the time to start transmission of each of the plurality of radiation images such that the readout period of the region of interest of each of the plurality of radiation images and the transmission period of each of the plurality of radiation images overlap with each other. Otherwise (if the overlap time Tovr cannot be set to be smaller than the threshold time Tth), in step S907, the imaging control unit 102 determines not to generate the radiation image, as in the case described above.

According to this modification, even when the communication speed temporarily decreases, it is possible to continue imaging of a moving image while suppressing a deterioration in image quality in the region of interest to a minimum.

Figure 12:
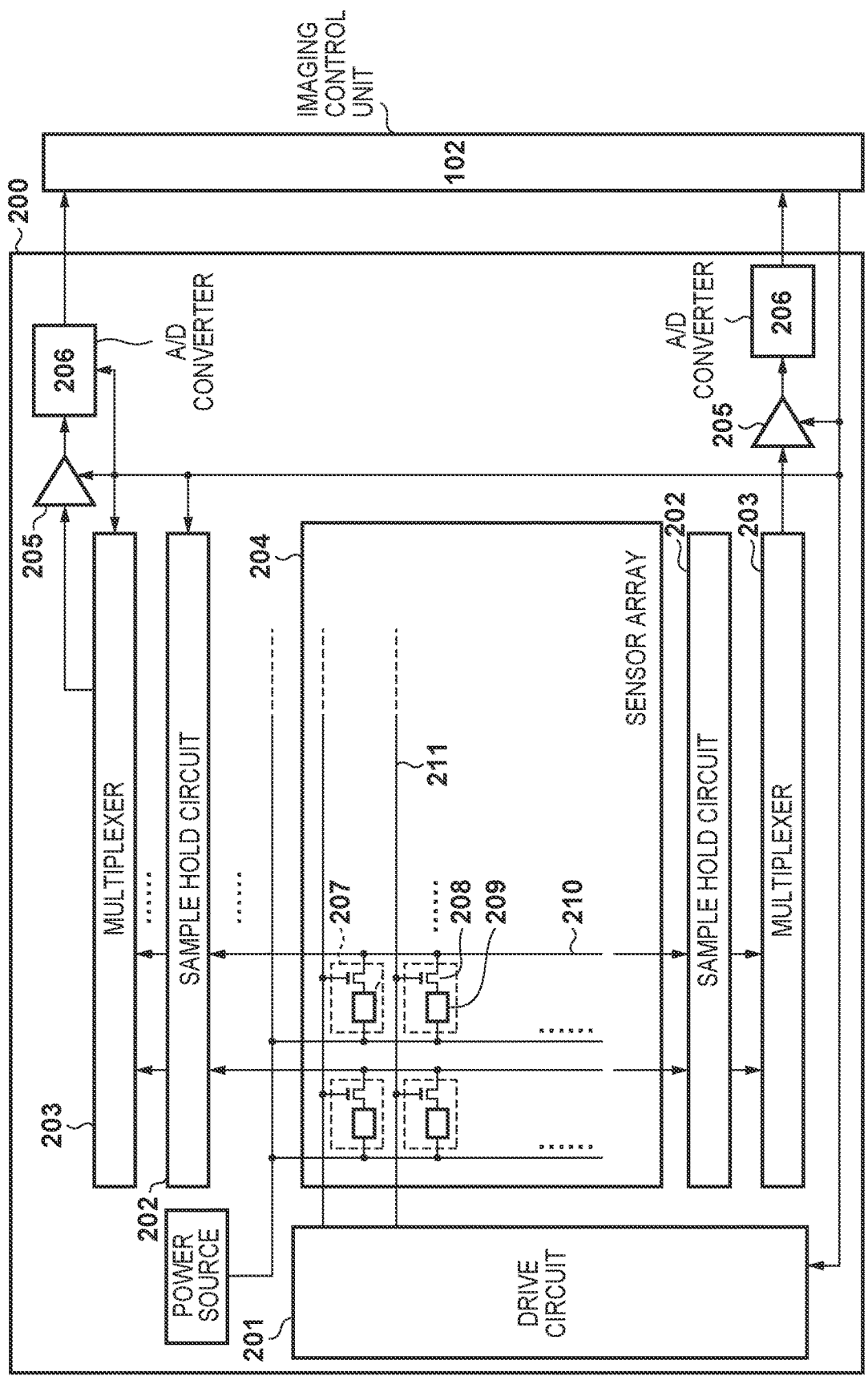
FIG. 12 is a block diagram for explaining another arrangement example of the radiation imaging apparatus according to the embodiment of the present disclosure.

Another modification of the above-described embodiment will be described with reference to FIG. 12. This modification can be combined with the modification described with reference to FIGS. 10 and 11. In the modification shown in FIG. 12, the radiation detection unit 200 includes a plurality of (for example, two) readout circuits. As has been described above, the sample hold circuit 202, the multiplexer 203, and the amplifier 205 form a readout circuit. The readout circuit (referred to as a first readout circuit hereinafter) on the upper side of the drawing reads out electric charges from the pixel rows in the upper half of the sensor array 204. The readout circuit (referred to as a second readout circuit hereinafter) on the lower side of the drawing reads out electric charges from the pixel rows in the lower half of the sensor array 204. Therefore, the radiation detection unit 200 can simultaneously read out electric charges from a plurality of pixel rows. This can shorten the readout time of a radiation image.

Figure 13A:
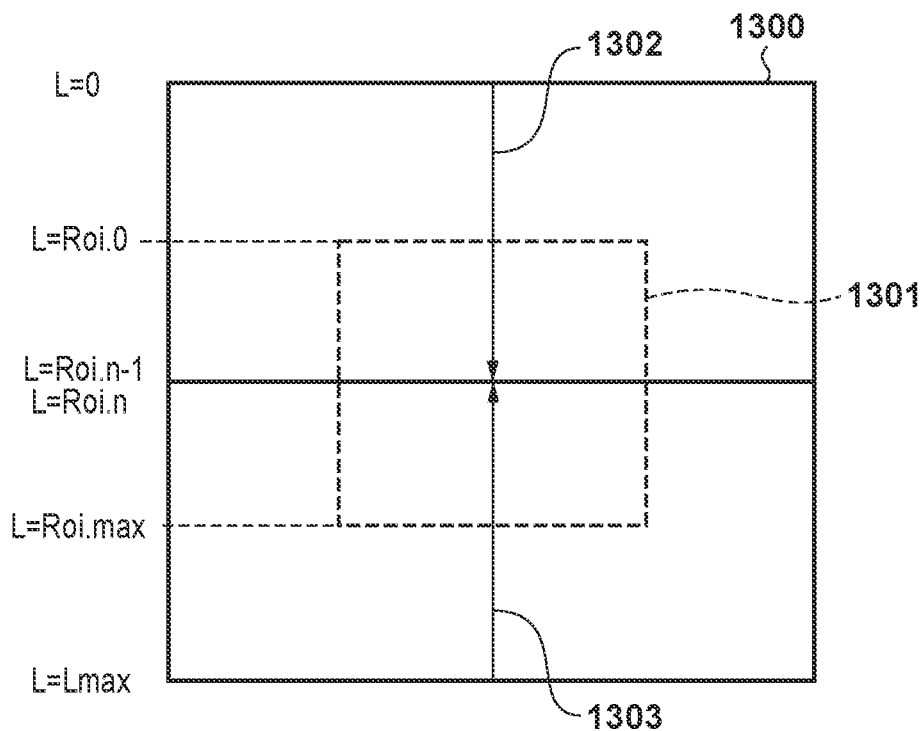
FIGS. 13A and 13B are schematic views for explaining another example of readout of a radiation image according to the embodiment of the present disclosure.
Figure 13B:
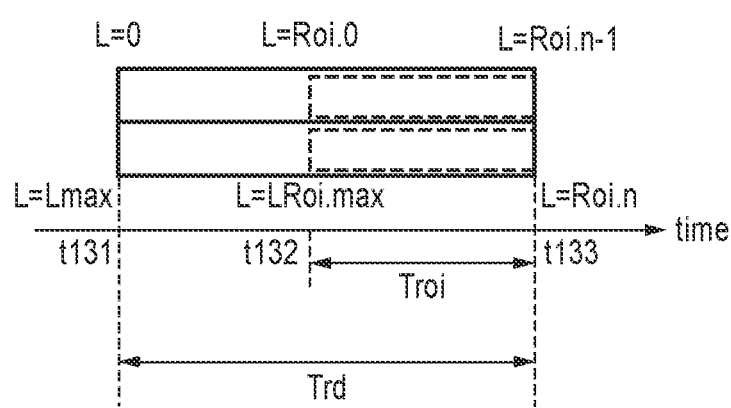

With reference to FIGS. 13A and 13B, the details of readout of a radiation image in this modification will be described. FIG. 13A shows an example of one radiation image, and FIG. 13B shows the readout period thereof. As shown in FIG. 13A, a radiation image 1300 includes a region 1301 of interest in the center thereof. The upper half of the radiation image 1300 is read out by the first readout circuit for each pixel row in the order indicated by an arrow 1302. The lower half of the radiation image 1300 is read out by the second readout circuit for each pixel row in the order indicated by an arrow 1303.

More specifically, at time t131, the first readout circuit starts to read out the radiation image 1300 from the pixel row (top row) indicated by "L=0". The second readout circuit starts to read out the radiation image 1300 from the pixel row (bottom row) indicated by "L=Lmax". Then, the first readout circuit shifts the pixel row subject to readout row by row in the direction of the arrow 1302, and the second readout circuit shifts the pixel row subject to readout row by row in the direction of the arrow 1303. After that, at time t132, readout for the region 1301 of interest is started from the pixel row indicated by "L =Roi.0" and the pixel row indicated by "L =Roi.max". At time t133, the readout for the region 1301 of interest is completed at the pixel row indicated by "L =Roi.n−1" and the pixel row indicated by "L =Roi.n".

In this case, the length of the period (that is, from time t131 to time t133) during which at least one of the readout circuits reads out the radiation image is the total readout time Trd of the above-described embodiment. Further, the length of the period (that is, from time t132 to time t133) during which at least one of the readout circuits reads out the radiation image for the region of interest is the partial readout time Troi of the above-described embodiment. The method illustrated in FIG. 9 is executed using these Trd and Troi. In the modification shown in FIGS. 13A and 13B, readout of the radiation image is completed when readout for the region of interest is completed, so that the operation similar to that shown in FIG. 8 described above is performed.

Figure 14A:
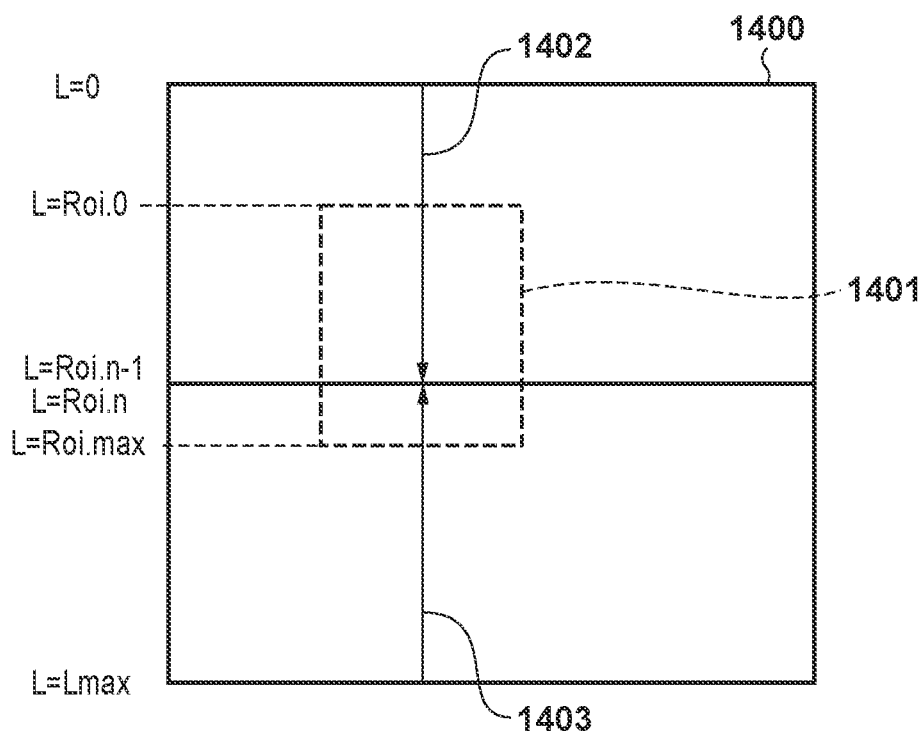
FIGS. 14A and 14B are schematic views for explaining still another example of readout of a radiation image according to the embodiment of the present disclosure.
Figure 14B:
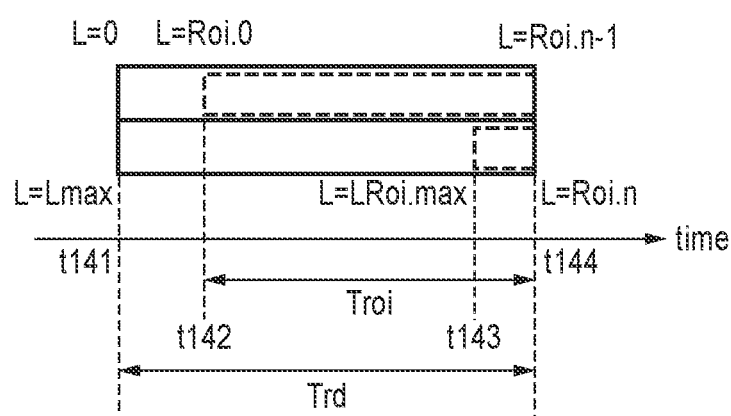

With reference to FIGS. 14A and 14B, the details of readout of another radiation image in this modification will be described. FIG. 14A shows an example of one radiation image, and FIG. 14B shows the readout period thereof. As shown in FIG. 14A, a radiation image 1400 includes a region 1401 of interest at a position shifted from the center thereof The upper half of the radiation image 1400 is read out for each pixel row in the order indicated by an arrow 1402 by the first readout circuit of the radiation imaging apparatus 101. The lower half of the radiation image 1400 is read out for each pixel row in the order indicated by an arrow 1403 by the second readout circuit of the radiation imaging apparatus 101.

More specifically, at time t141, the first readout circuit starts to read out the radiation image 1400 from the pixel row (top row) indicated by "L=0". The second readout circuit starts to read out the radiation image 1400 from the pixel row (bottom row) indicated by "L=Lmax". Then, the first readout circuit shifts the pixel row subject to readout row by row in the direction of the arrow 1402, and the second readout circuit shifts the pixel row subject to readout row by row in the direction of the arrow 1403. After that, at time t142, readout for the region 1401 of interest by the first readout circuit is started from the pixel row indicated by "L =Roi.0". Thereafter, at time t143, readout for the region 1401 of interest by the second readout circuit is started from the pixel row indicated by "L =Roi.max". At time t144, the readout for the region 1401 of interest is completed at the pixel row indicated by "L =Roi.n−1" and the pixel row indicated by "L=Roi.n".

In this case, the length of the period (that is, from time t141 to time t144) during which at least one of the readout circuits reads out the radiation image is the total readout time Trd of the above-described embodiment. Further, the length of the period (that is, from time t142 to time t144) during which at least one of the readout circuits reads out the radiation image for the region of interest is the partial readout time Troi of the above-described embodiment. The method illustrated in FIG. 9 is executed using these Trd and Troi. In the modification shown in FIGS. 14A and 14B, readout of the radiation image is completed when readout for the region of interest is completed, so that the operation similar to that shown in FIG. 8 described above is performed.

In the above-described modification, two readout circuits are respectively arranged on the upper and lower sides of the sensor array 204, and perform readout respectively from the upper and lower ends of the sensor array 204 toward the center. Instead, the two readout circuits may perform readout from the center of the sensor array 204 toward the upper and lower ends, respectively. Further, the two readout circuits may perform readout starting from different pixel rows and in the same direction. By setting the readout directions of the two readout circuits in this manner, readout can be performed in accordance with the position of the region of interest in the radiation image. As a result, the readout period of the region of interest can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-154971, filed Aug. 27, 2019, which is hereby incorporated by reference herein in its entirety.

What is claimed is:

1. A control apparatus of a radiation imaging apparatus configured to generate a plurality of radiation images to transmit to an external apparatus, the control apparatus comprising:
an acquisition unit configured to acquire a generation cycle of the plurality of radiation images, a partial readout time required for the radiation imaging apparatus to read out a region of interest in one radiation image of the plurality of radiation images, and a transmission time estimated to be required to transmit the one radiation image; and
a determination unit configured to determine, based on the generation cycle, the partial readout time, and the transmission time, a time at which the radiation imaging apparatus starts transmission of the plurality of radiation images.

2. The control apparatus according to claim 1, wherein in a case where a value obtained by subtracting the partial readout time from the generation cycle is larger than the transmission time, the determination unit determines the time to start transmission of the plurality of radiation images such that readout periods of regions of interest in the plurality of radiation images and transmission periods of the plurality of radiation images do not overlap with each other.

3. The control apparatus according to claim 1, wherein the acquisition unit further acquires a total readout time required for the radiation imaging apparatus to read out one radiation image, and
in a case where a value obtained by subtracting the total readout time from the generation cycle is larger than the transmission time, the determination unit determines the time to start transmission of the plurality of radiation images such that readout periods of the plurality of radiation images and transmission periods of the plurality of radiation images do not overlap with each other.

4. The control apparatus according to claim 3, wherein in a case where the value obtained by subtracting the total readout time from the generation cycle is smaller than the transmission time, the determination unit determines the time to start transmission of the plurality of radiation images such that readout periods of regions other than the regions of interest in the plurality of radiation images and the transmission periods of the plurality of radiation images overlap with each other.

5. The control apparatus according to claim 1, wherein in a case where a value obtained by subtracting the partial readout time from the generation cycle is smaller than the transmission time, the determination unit determines not to generate the plurality of radiation images.

6. The control apparatus according to claim 1, wherein in a case where a value obtained by subtracting the partial readout time from the generation cycle is smaller than the transmission time, and a value obtained by adding a threshold time to the generation cycle and subtracting the partial readout time therefrom is larger than the transmission time, the determination unit determines a time to start transmission of the plurality of radiation images such that readout periods of regions of interest in the plurality of radiation images and transmission periods of the plurality of radiation images overlap with each other.

7. The control apparatus according to claim 6, wherein in a case where the value obtained by adding the threshold time to the generation cycle and subtracting the partial readout time therefrom is smaller than the transmission time, the determination unit determines not to generate the plurality of radiation images.

8. The control apparatus according to claim 1, wherein the radiation imaging apparatus comprises a plurality of readout circuits configured to read out the image in different pixel rows, and
the partial readout time is a time during which at least one of the plurality of readout circuits reads out a region of interest in one radiation image.

9. The control apparatus according to claim 1, wherein the control apparatus is included in the radiation imaging apparatus.

10. The control apparatus according to claim 1, wherein each of the radiation imaging apparatus and the control apparatus comprises an internal timers, and the internal timers are synchronized with each other.

11. A radiation imaging system comprising:
a radiation imaging apparatus;
a control apparatus according to claim 1; and
an apparatus configured to process image data generated by the radiation imaging apparatus.

12. A method of controlling a radiation imaging apparatus configured to generate a plurality of radiation images to transmit to an external apparatus, the method comprising:
acquiring a generation cycle of the plurality of radiation images, a partial readout time required for the radiation imaging apparatus to read out a region of interest in one radiation image of the plurality of radiation images, and a transmission time estimated to be required to transmit the one radiation image; and
determining, based on the generation cycle, the partial readout time, and the transmission time, a time at which the radiation imaging apparatus starts transmission of the plurality of radiation images.

* * * * *